Aug. 19, 1947.  A. R. STONE  2,425,762

AZIMUTH INDICATOR

Filed Nov. 22, 1943  2 Sheets-Sheet 1

Inventor
ALBERT R. STONE,

By C. E. Herestrom & H. E. Thibodeau
Attorneys

Aug. 19, 1947.  A. R. STONE  2,425,762
AZIMUTH INDICATOR
Filed Nov. 22, 1943  2 Sheets-Sheet 2
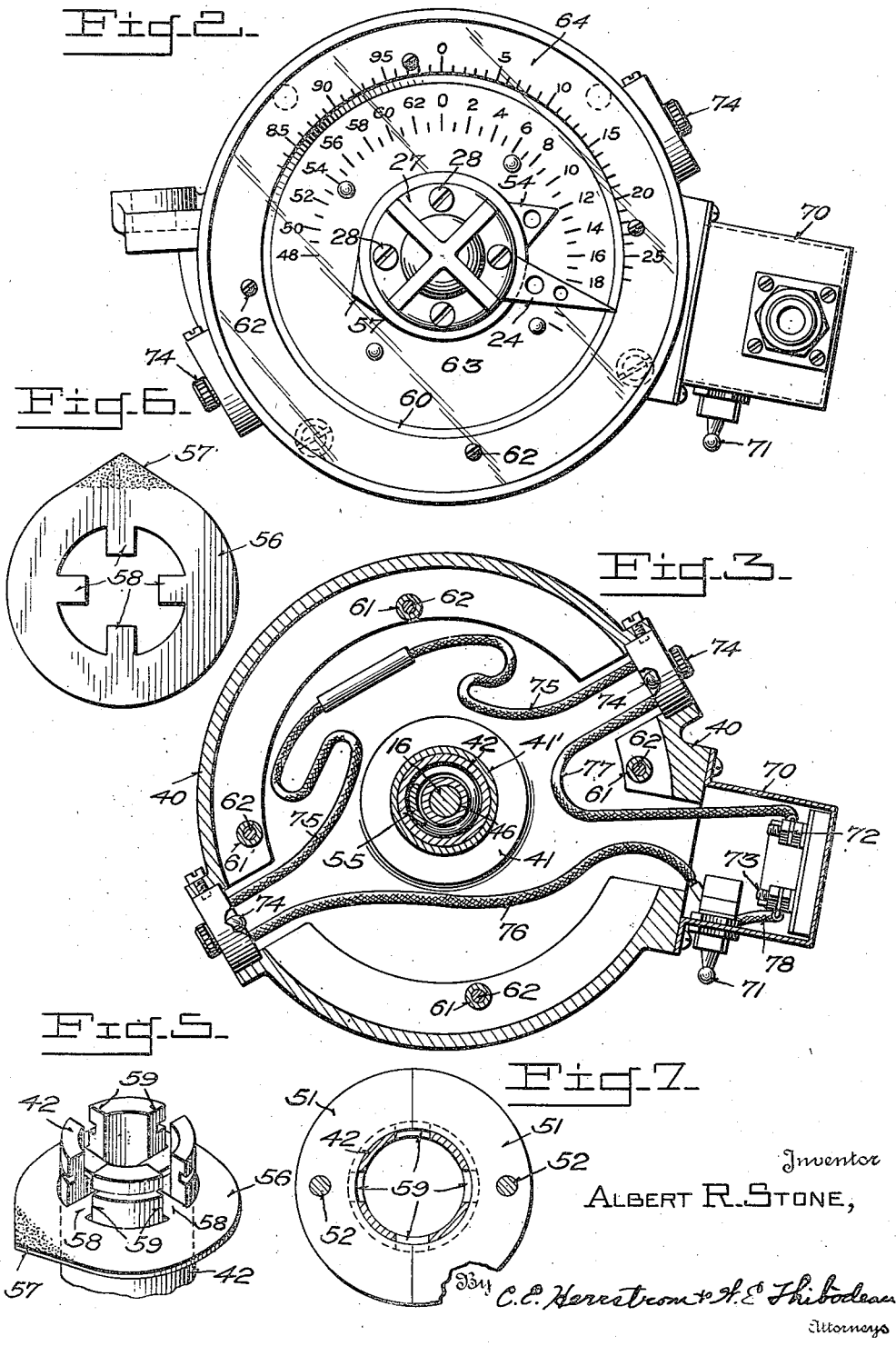
Inventor
ALBERT R. STONE, Patented Aug. 19, 1947

2,425,762

UNITED STATES PATENT OFFICE 2,425,762

AZIMUTH INDICATOR

Albert Rivington Stone, Anneslie, Md.

Application November 22, 1943, Serial No. 511,279

4 Claims. (Cl. 116—124)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel azimuth indicator for gun traverse, particularly in connection with the gun carried by the rotatable turret of a combat tank.

Where the gunner's view of the target is obstructed, it is desirable that he be able to use the tank as a field artillery piece by having the traverse angle communicated to him from an observation post. The azimuth indicator enables him to traverse the gun according to such direction.

The indicator constituting the present invention is particularly designed for tank use and shows the traverse angle in mils. The pointers may be manually set at zero at the proper time by a construction which permits such movement relatively to the turret drive gearing. A clutch device and other novel features are employed for this purpose.

There is also included an additional pointer fixed relatively to the turret drive gearing to indicate at all times the angular relation of the gun to a fixed reference point or a plane. This pointer is also utilized as a part of the frictional or split drive to one of the angle-communicating pointers that can be zeroized.

An illustrative embodiment of the invention is disclosed in the following description and in the accompanying drawings in which:

Figure 2 is a plan view, with guard removed;

Figure 3 is a section on the line 3—3 of Figure 1;

Figure 5 is a perspective view of the positively driven pointer forming part of my invention;

Figure 6 is a plan view of the pointer shown in Figure 5; and

Figure 7 is a detail section taken above divided disc 51 taken on line 7—7 of Figure 1.

Figure 1:
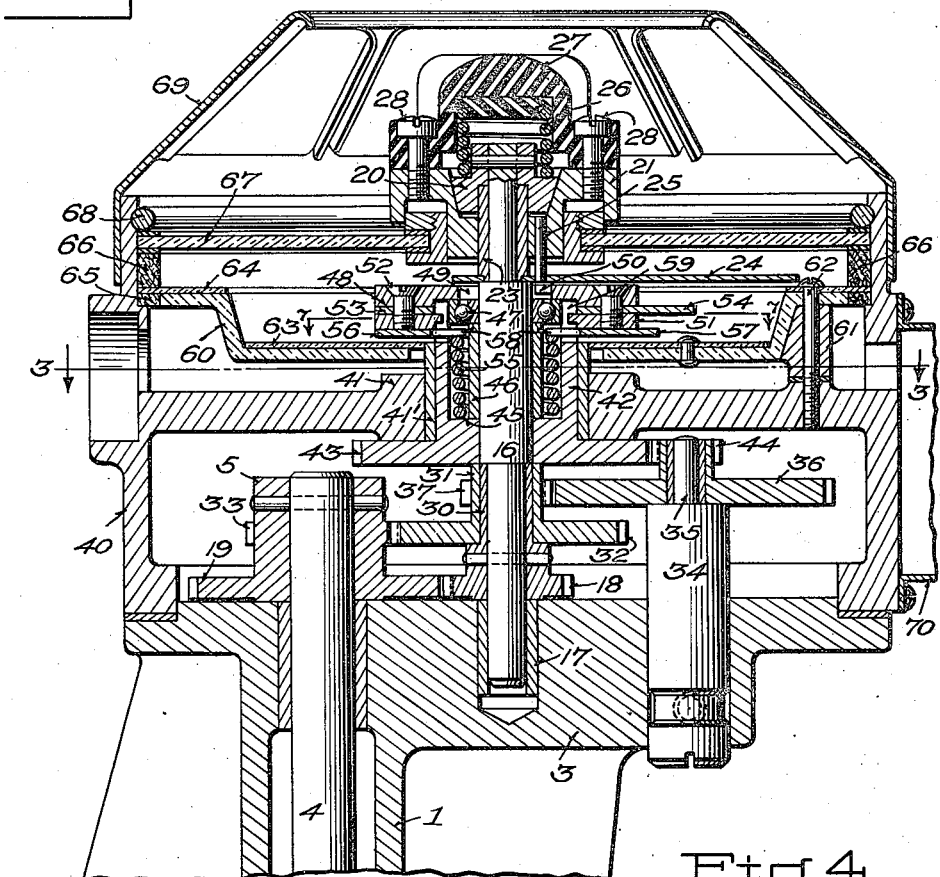
Figure 1 is a longitudinal section of the device.
Figure 4:
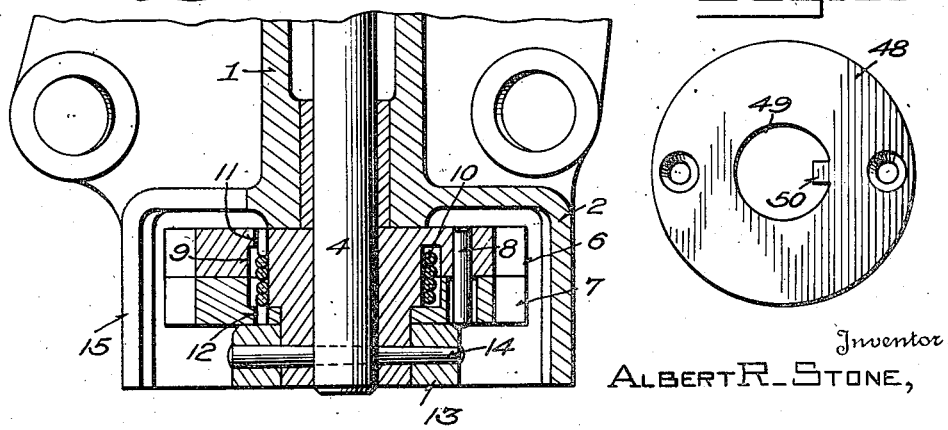
Figure 4 is a plan view of an internally toothed supporting member.

In Figure 1 is shown a body member including a hollow column 1 formed with a gear case 2 at one end and a base or platform at the other end. In the column is journalled a shaft 4 suspended by means of a hub 5 fastened to one end of the shaft and bearing upon the base 3.

On the other end of the shaft and within the case 2 is mounted a gear 6 adjacent to which is a registering annular gear 7. The gears are joined by a pin 8 fitted closely in the gear 6 and freely in the gear 7. The gears are further formed in their meeting faces with a pocket 9 receiving a torsion spring 10 having its free ends received in aperture 11 and 12 in the respective gears. Beneath the gear 7 is a collar 13 fastened to the shaft by a pin 14. The side wall of the case 2 has an opening 15 to receive a gear train (not shown) extending from the apparatus whose position is to be indicated, in this case, the turret of a tank, and meshing with one or both of the gears 6, 7. The spring tends to stagger the teeth of gears 6, 7 and press them respectively against opposite faces of a meshing gear tooth, thereby absorbing back-lash.

An indicator shaft 16 is mounted parallel to the shaft 4 with one end journalled at 17 in the base 3. To the shaft 16 is secured a pinion 18 bearing upon the base 3 and meshing with a gear 19 formed on the hub 5. On the other end of the shaft 16 is fastened a cone 20 seated in a complementary member 21 surrounding a sleeve 23 loosely mounted on the shaft 16. To the sleeve is secured a laterally extended pointer 24, the function of which will presently be described. A pin 25 rigidly connects the member 21 to the pointer 24. It is now evident that rotation of the shaft 4 is transmitted to the shaft 16 and through the cone clutch 20, 21 to the pointer 24.

A coil spring 26 is seated upon the cone 20 and has a button 27 mounted thereon and fastened to the seat member 21 by screws 28. The button may be depressed manually to disengage the clutch 20, 21 and then rotated to reset the pointer 24 without disturbing other parts of the apparatus.

The pinion 18 has an extended hub 30 on which is mounted another hub 31 formed with a gear 32 meshing with gear 33 formed on the hub 5. A shaft 34 is fastened in the base 3 and is formed with a reduced upper end 35 on which is loosely mounted a gear 36 meshing with a pinion 37 formed with gear 32.

Upon the base 3 is mounted a housing member 40 providing a bearing 41 for a hollow hub 42 loosely mounted in sleeve 41' on the shaft 16. The hub is formed with a gear 43 meshing with a pinion 44 formed with the gear 36.

The cavity 45 of the hub 42 contains a bushing 46 positioned on the shaft 16. On the bushing is mounted a ball bearing 47 on which rests a ring 48 having a substantial clearance 49 around the shaft 16. The ring is formed with a tooth 50 extending into this clearance for a purpose that will presently be described. Another divided or halved ring 51 is secured beneath the ring 48 by screws 52, and between the rings is clamped an annular disk 53 formed with a pointer 54. The mechanism for actuating the pointer 54 will presently be described. If the aforementioned manual pressure on the clutch or seat 21 is continued, the pin 25 will be projected below the pointer 24 sufficiently to strike the tooth 50 on manual rotation of the button 27 and thereby reset the pointer 54. Independent resetting of the pointer 24 is available by restoring the pin 25 to the position shown in Figure 1.

In the cavity 45 is seated a coil spring 55 on which is mounted a disk 56 held by spring pressure against the ring 51 and formed with a pointer 57. The drive to the gear 43 is self evident. The drive on the disk 56 is accomplished through keys 58 thereon received in slots 59 cut in the hub 42 of the gear 43 see Figure 5.

A dished plate 60 is fastened upon the housing member 40 through four mounting posts 61 by screws 62. The bottom of the member 60 has fixed thereto a dial 63 with which the pointers 54 and 57 cooperate. The upper rim of the member 60 carries an annular dial 64, held by the screws 62, with which the pointer 24 cooperates.

A gasket 65 surrounds the rim of the member 60, and over the gasket is mounted a sealing ring 66 resting on the dial 64. The ring 66 supports a transparent plate or window 67 fastened by a split ring 68. Finally, a guard or cage 69 is mounted on the upper end of the body member 40 in a position to surround the button 27.

On a side of the housing member 40 is mounted a switch box 70 containing a toggle switch 71 and a pair of binding posts 72, 73. Two small lamps 74 are mounted in the lateral wall of the housing 40 at diametrically opposite points and are joined by a conductor 75. The remaining terminals of the lamps are joined by conductors 76, 77 respectively to the switch 71 and terminals 72. The switch is joined by a conductor 78 to the terminal 73, and both terminals are connected to a suitable current source. The lamps are disposed adjacent to the dished member, which is of a translucent material, and the dials 63 and 64 are also translucent, preferably darkened except at the graduations and numerals. The lamps are preferably of the lowest available candle power.

The dial 64 is graduated in mils. The dial 63 is graduated in hundred mils (6400 mils equal 360°). The pointer 24 is geared to make a complete revolution for a movement of one unit of the pointer 54.

In the operation of the device, the traverse angle is determined from an observation post in the usual manner and communicated to the gunner. The latter directs the gun, by traversing the turret, towards the observation post and sets both pointers 24 and 54 at zero by the means previously described. He then traverses the turret in the direction of the target until the pre-determined traverse angle is indicated by the pointers. The pointer 57, being fixed with the gear ring, shows the angular relation of the turret to a fixed point or plane of the turret-supporting body.

Although a specific embodiment of the invention has been illustrated and described, it will be understood that changes in the specific details of construction may be made without departure from the scope of the invention as indicated by the annexed claims.

What I claim is:

1. An azimuth indicator to be driven by the traversing mechanism including turret drive gearing of a rotatable tank turret carrying a gun on a turret-supporting body for indicating traverse of the gun in accordance with a predetermined traverse angle comprising, in combination, driving members adapted to be connectedly driven by rotation of said turret through operation of said traversing mechanism, two sets of corresponding graduated indices, two pointers movable at different proportional speed ratios over said indices, frictionally operated means for operating said two pointers through operation of said driving members, said two pointers being thereby driven by said driving members, means for manually setting one or both of said two pointers with respect to said indices, and a third pointer fixed relatively to said turret drive gearing and positively driven by said driving members, said third pointer cooperating with said two pointers and movable over one of said indices, said third pointer at all times indicating angular relation of said gun to a fixed reference point of said turret-supporting body.

2. An azimuth indicator to be driven by the traversing mechanism including turret drive gearing of a rotatable tank turret carrying a gun on a turret-supporting body for indicating traverse of the gun in accordance with a predetermined traverse angle comprising, in combination, driving members adapted to be connectedly driven by rotation of said turret through operation of said traversing mechanism, two sets of proportionately corresponding graduated indices, two pointers movable at different proportional speed ratios over said indices, frictionally operated means for operating said two pointers through operation of said driving members, said two pointers being thereby driven by said driving members, means for selectively setting one or both of said two pointers with respect to said indices, and a third pointer fixed relatively to said turret drive gearing and positively driven by said driving members, said third pointer cooperating with said two pointers and movable over one of said indices, said third pointer at all times indicating angular relation of said gun to a fixed reference point of said turret-supporting body.

3. An azimuth indicator to be driven by the traversing mechanism including turret drive gearing of a rotatable tank turret carrying a gun on a turret-supporting body for indicating traverse of the gun in accordance with a predetermined traverse angle comprising, in combination, driving members adapted to be connectedly driven by rotation of said turret through operation of said traversing mechanism, two sets of corresponding graduated indices, two pointers movable at different proportional speed ratios over said indices, spring urged clutches for operating said two pointers through operation of said driving members, said two pointers being thereby driven by said driving members, means for releasing one of said clutches to set one or both of said two pointers with respect to said indices, and a third pointer fixed relatively to said turret drive gearing and positively driven by said driving members, said third pointer cooperating with said two pointers and movable over one of said indices, said third pointer at all times indicating angular relation of said gun to a fixed reference point of said turret-supporting body.

4. An azimuth indicator to be driven by the traversing mechanism including turret drive gearing of a rotatable tank turret carrying a gun on a turret-supporting body for indicating traverse of the gun in accordance with a predetermined traverse angle comprising, in combination, driving members adapted to be connectedly driven by rotation of said turret through operation of said traversing mechanism, two sets of corresponding graduted indices, two pointers movable at different proportional speed ratios over said indices, a spring urged clutch including a driving and a driven element for driving one of said two pointers through operation of said driving members, a driving pin depending from said driving element and connecting the latter to said one of said two pointers, a supporting member having an extending tooth positively connected to the other of said two pointers, manually releasable spring means urging said driving and driven elements of said clutch into engagement, said driving pin being adapted on manual operation of said manually releasable spring means to selectively extend into the path of said extending tooth of said supporting member to set said other of said two pointers with respect to said indices, a third pointer on a third pointer member fixed relatively to said turret drive gearing and positively driven by said driving members, and frictionally operated means for driving said other of said two pointers through operation of said driving members, said frictionally operated means including a spring pressing said third pointer member in driving relationship to said other of said two pointers, said third pointer being movable over one of said indices and at all times indicating angular relationship of said gun to a fixed reference point of said turret-supporting body.

ALBERT RIVINGTON STONE.

REFERENCES CITED

The following references are of record in the file of this patent:

UNITED STATES PATENTS

| Number | Name | Date |
| --- | --- | --- |
| 1,855,071 | Stefanson | Apr. 19, 1932 |
| 1,162,511 | Pollen et al. | Nov. 30, 1915 |
| 1,755,340 | Sperry et al. | Apr. 22, 1930 |
| 669,898 | Emery | Mar. 12, 1901 |
| 1,446,336 | Dawson et al. | Feb. 20, 1923 |